United States Patent
Benning et al.

(10) Patent No.: US 6,594,226 B1
(45) Date of Patent: Jul. 15, 2003

(54) APPARATUS AND METHOD OF ENHANCING TRANSMIT DIVERSITY

(75) Inventors: Roger David Benning, Long Valley, NJ (US); R. Michael Buehrer, Morristown, NJ (US); Robert Atmaram Soni, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/464,615

(22) Filed: Dec. 15, 1999

(51) Int. Cl.[7] .......................... H04J 11/00; H04B 7/216
(52) U.S. Cl. .................... 370/208; 370/209; 370/335; 375/267; 342/354; 343/844
(58) Field of Search ................................ 370/203, 208, 370/209, 334, 335, 342; 375/267, 299, 144, 146, 347, 147, 145; 455/101, 269, 276.1, 562; 343/844; 342/354, 368, 373, 374, 375

(56) References Cited

U.S. PATENT DOCUMENTS

| | | | | |
|---|---|---|---|---|
| 5,513,176 A | * | 4/1996 | Dean et al. ................. | 370/18 |
| 5,956,345 A | * | 9/1999 | Allpress et al. .............. | 370/480 |
| 6,198,434 B1 | * | 3/2001 | Martek et al. ............... | 342/373 |
| 6,356,555 B1 | * | 3/2002 | Rakib et al. ................. | 370/441 |
| 6,396,822 B1 | * | 5/2002 | Sun et al. .................... | 370/335 |

* cited by examiner

Primary Examiner—Huy D. Vu
Assistant Examiner—Duc Ho
(74) Attorney, Agent, or Firm—Jimmy Goo (57) ABSTRACT

Disclosed is a method and apparatus for enhancing diversity gain without reducing data rate by increasing the number of antenna elements and configuring the antenna elements for improving signal-to-noise ratio at a receiver. The antenna array comprise a first antenna group with at least two antenna elements and a second antenna group with at least one antenna element. The first and second antenna groups are spaced approximately ten carrier wavelengths or more apart from each other, and the antenna elements belonging to the first antenna group are spaced approximately a half carrier wavelength or less apart from each other. A plurality of data streams is generated from a signal and used to produce a first and second plurality of representative data streams. Each of the first plurality of representative data streams is phase-shifted and encoded using different orthogonal codes.

26 Claims, 4 Drawing Sheets

APPARATUS AND METHOD OF ENHANCING TRANSMIT DIVERSITY

RELATED APPLICATION

Related subject matter is disclosed in the following application and assigned to the same assignee hereof: U.S. patent application Ser. No. 09/294,661 entitled, "Method And Apparatus For Downlink Diversity In CDMA Using Walsh Codes," inventors R. Michael Buehrer, Robert Atmaram Soni, and Jiann-an Tsai, filed on Apr. 19, 1999.

BACKGROUND OF THE RELATED ART

Third generation wireless communication systems include downlink (i.e., communication link from a base station to a mobile-station) performance improvement techniques. One technique for improving downlink performance is to use, at the base station, a transmit diversity scheme (also referred to herein as diversity gain).

Transmit diversity can be used to improve fading distribution in the received signal, and is typically achieved using an antenna array configuration having M antenna elements spaced far apart and transmitting identical signals. By spacing the antenna elements far apart, fading is distributed since each of the signals will travel a different path from its transmitting antenna element to the mobile-station and experience a different distortion or fading process. Thus, the mobile-station receives identical signals affected by different fading processes or distortions. Since each signal should experience a different distortion or fading process, it becomes less probable that all the signals will undergo deep fades. Thus, fading distribution is improved.

When the received signals are properly combined by the mobile-station, the result is a signal with an improved bit error rate due to improved fading distribution although average signal-to-noise ratio remains approximately the same as if transmit diversity was not employed. In order to combine the received signals, the mobile-station needs to be capable of separating the individual received signals from each other. Separating the individual received signals is difficult if the signals were transmitted using a same frequency. Different frequencies may be used to transmit the individual signals such that separation of the received signals is easier. However, such method consumes additional bandwidth, which is undesirable. A same frequency may be used to transmit the signals in code division multiple access (CDMA) systems employing delay diversity techniques, which would allow signals to be separated through long spreading codes. Although additional bandwidth is not consumed, this technique causes mutual interference due to multipaths being intentionally created by the delay diversity techniques.

One technique for avoiding the mutual interference problem is orthogonal transmit diversity, which applies only to coded systems. Orthogonal transmit diversity involves transmitting alternate data bits modulated with different Walsh codes from different antenna elements. Diversity is gained in the decoding process when a convolutional code is employed with a Viterbi decoder, but not on the data bits itself since the antenna elements are transmitting only alternate data bits (and not all the data bits or the entire signal). In systems with weak convolutional or other error correction codes (for example, due to puncturing), the performance gained by orthogonal transmit diversity techniques may degrade.

The weakness of orthogonal transmit diversity may be overcome using a technique referred to herein as space time spreading (STS). STS involves transmitting all data bits (but not necessarily the same representations of the data bits) on two antenna elements using different Walsh codes, thus diversity is achieved on the data bits. No coding is required to achieved diversity (although coding may still be used), thus diversity will not degrade if coding is weak.

Figure 1:
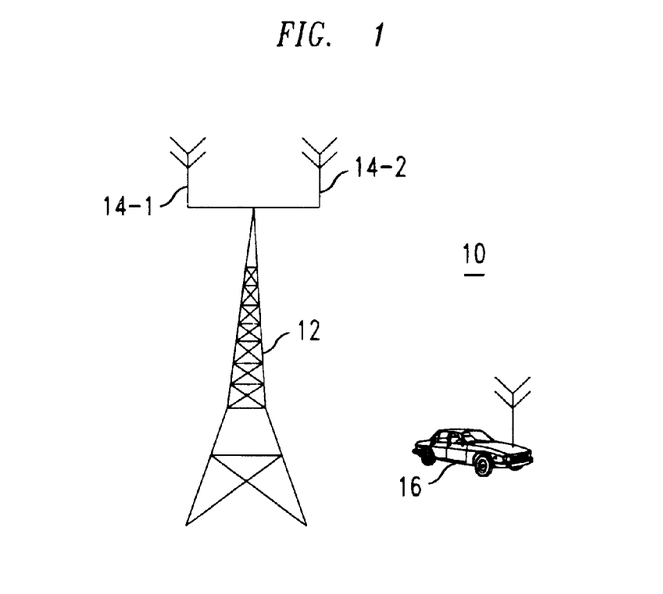
FIG. 1 depicts a wireless communication system employing space time spreading techniques in accordance with the prior art.

FIG. 1 depicts a wireless communication system 10 employing STS. Wireless communication system 10 comprises at least one base station 12 having two antenna elements 14-1 and 14-2, wherein antenna elements 14-1 and 14-2 are spaced far apart for achieving transmit diversity. Base station 12 receives a signal S for transmitting to mobile-station 16. Signal S is alternately divided into signals $s_e$ and $s_o$, wherein signal $s_e$ comprises even data bits and signal $s_o$ comprises odd data bits. Signals $s_e$ and $s_o$ are processed to produce signals $S^{14-1}$ and $S^{14-2}$. Specifically, $s_e$ is multiplied with Walsh code $w_1$ to produce signal $s_e w_1$; a conjugate of signal $s_o$ is multiplied with Walsh code $w_2$ to produce signal $s_o^* w_2$; signal $s_o$ is multiplied with Walsh code $w_1$ to produce $s_o w_1$; and a conjugate of signal $s_e$ is multiplied with Walsh code $w_2$ to produce $s_e^* w_2$. Signal $s_e w_1$ is added to signal $s_o^* w_2$ to produce signal $S^{14-1}$ (i.e., $S^{14-1} = s_e w_1 + s_o^* w_2$) and signal $s_e^* w_2$ is subtracted from signal $s_o w_1$ to produce signal $S^{14-2}$ (i.e., $S^{14-2} = s_o w_1 - s_e^* w_2$) Signals $S^{14-1}$ and $S^{14-2}$ are transmitted over antenna elements 14-1 and 14-2, respectively.

Mobile-station 16 receives signal R comprising $\gamma_1(S^{14-1}) + \gamma_2(S^{14-2})$, wherein $\gamma_1$ and $\gamma_2$ are distortion factor coefficients associated with the transmission of signals $S^{14-1}$ and $S^{14-2}$ from antenna elements 14-1 and 14-2 to mobile-station 16, respectively. Distortion factor coefficients $\gamma_1$ and $\gamma_2$ can be estimated using pilot signals, as is well-known in the art. Mobile-station 16 decodes signal R with Walsh codes $w_1$ and $w_2$ to respectively produce outputs:

$$W_1 = \gamma_1 s_e + \gamma_2 s_o \qquad \text{equation 1}$$

$$W_2 = \gamma_1 s_o^* - \gamma_2 s_e^* \qquad \text{equation 1a}$$

Using the following equations, estimates of signals $s_e$ and $s_o$, i.e., $\hat{s}_e$ and $\hat{s}_o$, may be obtained:

$$\hat{s}_e = \gamma_1^* W_1 - \gamma_2 W_2^* = s_e(|\gamma_1|^2 + |\gamma_2|^2) + \text{noise} \qquad \text{equation 2}$$

$$\hat{s}_o = \gamma_2^* W_1 + \gamma_1 W_2^* = s_o(|\gamma_1|^2 + |\gamma_2|^2) + \text{noise}' \qquad \text{equation 2a}$$

STS, however, does not scale naturally to more than two antenna elements to enhance diversity gain without having to reduce data rate. Accordingly, there exists a need to enhance diversity gain without reducing data rate.

SUMMARY OF THE INVENTION

The present invention is a method and apparatus for enhancing diversity gain without reducing data rate by increasing the number of antenna elements for purposes of improving signal-to-noise ratio at a receiver. In one embodiment, the present invention is employed using an antenna array having a first antenna group with at least two antenna elements and a second antenna group with at least one antenna element. The first and second antenna groups are spaced approximately ten carrier wavelengths or more apart from each other, and the antenna elements belonging to the first antenna group are spaced approximately a half carrier wavelength or less apart from each other.

A signal is processed for transmission over the antenna array by first generating a plurality of data streams from the signal. A first plurality of representative data streams is derived from the plurality of data streams, and a second plurality of representative data streams is derived from the plurality of data streams. Each of the first plurality of representative data streams is phase-shifted and encoded using different orthogonal codes, and each of the second plurality of representative data streams is encoded using different orthogonal codes, wherein a different orthogonal code is used to encode representative data streams of the first and second plurality of representative data streams generated from a same data stream of the plurality of data streams, and the first and second plurality of representative data streams are representatives of the plurality of data streams that allow for the plurality of data streams to be recovered at a receiver after encoding and transmission. The encoded and phase shifted first plurality of representative data streams being transmitted over the first antenna group, and the encoded second plurality of representative data streams being transmitted over the second antenna group.

In one embodiment of the present invention, a pilot signal is transmitted along with the encoded and phase shifted first plurality of representative data streams over each antenna element belonging to the first antenna group, and a pilot signal is transmitted along with the encoded plurality of representative data streams being transmitted over each antenna element belonging to the first antenna group. The pilot signal being transmitted over each antenna element in the first and second antenna groups may be identical or different (in terms of orthogonal codes being applied to each pilot signal or sequence of bits comprising each pilot signal).

BRIEF DESCRIPTION OF THE DRAWINGS

The features, aspects, and advantages of the present invention will become better understood with regard to the following description, appended claims, and accompanying drawings where

DETAILED DESCRIPTION

Figure 2:
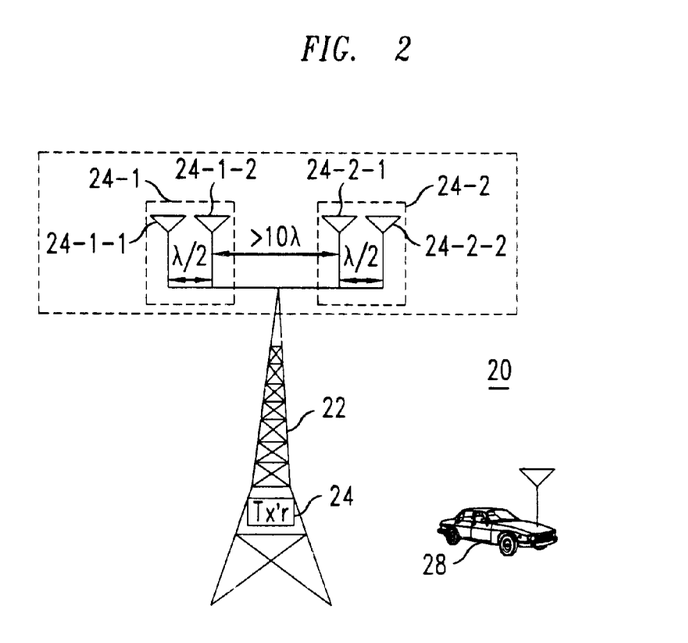
FIG. 2 depicts a wireless communication system employing code division multiple access techniques in accordance with the present invention.

FIG. 2 depicts a wireless communication system 20 employing code division multiple access (CDMA) techniques in accordance with the present invention. Wireless communication system 20 comprises at least one base station 22 having an antenna array 23 and a transmitter 24. Antenna array 23 comprises antenna groups 24-n, where n=1, ..., N and N≧2. Each group 24-n having antenna elements 26-men, where m is an antenna element index for the associated group 24-n, men=1, ... Men, and ΣMen≧N+1 (i.e., Men≧1 but Men≧2 for at least one group 24-n). Note that Men may be a different value for different antenna groups 24-n. Base station 22 employs an antenna array configuration and a signal processing technique based on the antenna array configuration to achieve N-fold diversity gain while increasing signal-to-noise ratio by an average M-fold, as will be described herein.

Antenna array 23 is configured in the following manner to provide for N-fold diversity gain and average M-fold signal-to-noise ratio improvement. First, groups 24-n are spaced a sufficient distance apart such that signals transmitted from different groups experience independent or uncorrelated fading, thereby allowing fore N-fold diversity gain. Second, antenna elements 26-men belonging to a same group 24-n are closely spaced such that signals transmitted from these antenna elements 26-men experience correlated fading, thereby allowing for average M-fold signal-to-noise improvement when antenna elements 26-men are co-phased.

In an illustrative example, antenna array 23 comprises of two groups 24-1 and 24-2, wherein group 24-1 has antenna elements 26-1∈1 and 26-2∈1 and group 24-2 has antenna elements 26-1∈2 and 26-2∈2. Groups 24-1 and 24-2 are spaced approximately ten carrier wavelengths ($10\lambda$) or more apart, antenna elements 26-1∈1 and 26-1∈1 are spaced approximately a half carrier wavelength ($\lambda/2$) apart, and antenna elements 26-1∈2 and 26-2∈2 are spaced approximately a half carrier wavelength ($\lambda/2$) apart. Although the exact inter-antenna element spacing is not crucial, it is not desirable to have inter-antenna element spacing greater than a half carrier wavelength since grating lobes may be introduced. To facilitate understanding of the present invention, the illustrative example will also be used herein to describe the signal processing technique with respect to a single signal S intended for mobile-station 28 (ignoring signals intended for other mobile-stations).

The signal processing technique is based on the antenna array configuration and is embodied in transmitter 24, which can be any combination of software and/or hardware, such as ASICs, DSPs, repeaters, mixers, modulators, filters and summers, for processing signal S in accordance with the present invention. The signal processing technique involves encoding representative data streams generated from signal S with Walsh (or some other orthogonal) codes such that signal S may be recovered at mobile-station 28 (or another receiver) and phase shifting the representative data streams to improve signal-to-noise ratio at mobile-station 28. The first part of the signal processing technique processes signal S for transmission over antenna array 23 such that it may be recovered at mobile-station 28. First, D data streams $s_d$ are generated from signal S, where d=1, ..., D and D is N rounded up to the nearest power of two. In the illustrative example, signal S may be alternately divided into two data streams $s_1$ and $s_2$, i.e., D=2. Note that data streams $s_d$ may be generated from signal S in some manner other than alternately dividing signal S. For example, each data stream $s_d$ may include all of the bits comprising signal S, some or all data streams $s_d$ may include bits that are in other data streams, bits in each data stream $s_d$ may be repeated and/or inversed, etc.

Next, a representative of each data stream $s_d$ is encoded using Walsh codes $w_r$ for transmission over each antenna element 26-men, where r=1, ..., R and R≧D. The manner in which the representatives of each data stream $s_d$ are encoded are based on the following three concepts. First, for data streams $s_d$ being transmitted over antenna elements 26-men belonging to a same group 24-n, representatives of different data streams $s_d$ are multiplied with different Walsh codes $w_r$. Second, for data streams $s_d$ being transmitted over antenna elements 26-men belonging to different groups 24-n, representatives of same data streams $s_d$ are multiplied with different Walsh codes $w_r$. Third, the representatives of data streams $s_d$ (also referred to herein as "representative data streams $f_g(s_d)$") being encoded for transmission over each antenna element 26-men are chosen from the set $$f_g(s_d) = \begin{cases} s_d & \text{for } g = 1 \\ -s_d & \text{for } g = 2 \\ 0 & \text{for } g = 3 \\ s_d^* & \text{for } g = 4 \\ -s_d^* & \text{for } g = 5 \end{cases} \quad \text{equation 3}$$

(where the asterisk * indicates that the term is a transposed conjugate) such that $$\sum_{r=1}^{R} f_g(s_d^n) w_r [f_g(s_{d'}^{n'}) w_r]^* = 0 \quad \text{equation 4}$$

where the superscripts indicate the antenna group 24-n over which data stream $s_d$ will be transmitted, n'=1, ... ,N, n'≠n, d'=1, ... ,D and d'≠d. Note that the third encoding concept involves choosing representative data streams $f_g(s_d)$ such that data streams $s_d$ can mathematically be recovered, i.e., terms cancel out, after encoding at mobile-station 28.

The above described three encoding concepts can alternately be explained using transmission matrix T, for example, for the illustrative two group antenna array configuration and signal S:

$$T = \begin{bmatrix} s_d^n & s_{d'}^{n'} \\ s_{d'}^{n'*} & -s_d^{n*} \end{bmatrix} \quad \text{equation 5}$$

Transmission matrix T having the following properties: each column corresponds to an antenna group 24-n and includes representative data streams $f_g(s_d)$ for each data stream $s_d$ to be transmitted over the corresponding antenna group 24-n (e.g., $s_d^n$ and $s_d^{n*}$ are transmitted over antenna elements belonging to group 24-n, and $s_d^{n'}$ and $-s_d^{n'*}$ are transmitted over antenna elements belonging to group 24-n'); no row or column should include more than one representative of a same data stream $s_d$; and any column multiplied with transposed conjugates of another column results in a value of zero (e.g., $s_d^n s_{d'}^{n'*} + s_{d'}^{n'*}(-s_d^{n*})=0$), i.e., data streams $s_d$ can mathematically be recovered after encoding at mobile-station 28. Each row of representative data streams $f(s_d)$ in transmission matrix T is multiplied with a different Walsh code $w_r$. By multiplying each row of transmission matrix T with a different Walsh code $w_r$, the aforementioned three encoding concepts are satisfied.

It should be understood that for a different number of groups 24-n and/or different number of mobile-stations (or signals S for transmission), the aforementioned transmission matrix properties would remain the same but the size of transmission matrix T would change. In one embodiment, for N groups of antenna elements and Z mobile-stations, the transmission matrix would have N columns and D×Z number of rows. For example, if there were one mobile-station and three antenna groups 24-n (i.e., N=3), each signal S for each mobile-station would be split into four data streams (i.e., D=4). The corresponding transmission matrix would have three columns and four rows (i.e., D×Z=4), wherein each data stream $s_d$ for each mobile-station would be in each column but not in every row.

Applying the variables of the illustrative example, transmission matrix T would be as follows:

$$T = \begin{bmatrix} s_1^1 & s_2^2 \\ s_2^{1*} & -s_1^{2*} \end{bmatrix} \quad \text{equation 5a}$$

The representative data streams $f(s_d)$ in rows one and two are multiplied with Walsh codes $w_1$ and $w_2$, respectively, to produce signals $s_1^1 w_1$, $s_2^{1*} w_2$, $s_2^2 w_1$ and $-s_1^{2*} w_2$, wherein signals $s_1^1 w_1$ and $s_2^{1*} w_2$ are transmitted over antenna group 24-1 and signals $s_2^2 w_1$ and $-s_1^{2*} w_2$ are transmitted over antenna group 24-2. Alternately, representative data streams $s_2^2$ and/or $-s_1^{2*}$ in column two may be multiplied with Walsh codes other than Walsh codes $w_1$ and $w_2$, respectively, so long as the Walsh codes are different from the Walsh codes being used to encode respective representative data streams $s_2^{1*}$ and/or $s_1^1$ in column one.

The second part of the signal processing technique involves phase shifting the data streams $s_d$ (or their representatives) to improve signal-to-noise ratio at mobile-station 28. This part uses complex weights $v_{m \in n}$ to co-phase antenna elements 26-m∈n such that signals transmitted from a same group 24-n arrive at mobile-station 28 in-phase. Each antenna element 26-m∈n has an associated complex weight $v_{m \in n}$ comprising of an in-phase component $c_{m \in n}^1$ and a quadrature-phase component $c_{m \in n}^Q$, as is well-known in the art. Complex weights $v_{m \in n}$ are set equal to $e^{-j\theta_{m \in n}}$ in order to maximize signal-to-noise ratio (SNR) at mobile-station 28, wherein $\theta_{m \in n}$ represents a phase difference between signals sent from antenna elements 26-m∈n as seen at mobile-station 28. Disclosed herein for illustration purposes are two techniques for determining complex weights $v_{m \in n}$. This should not be construed to limit the present invention in any manner.

In a first technique, complex weights $v_{m \in n}$ are based on estimates of $\theta_{m \in n}$ from uplink information. This technique requires an uplink phased antenna array for measuring $\theta_{m \in n}^{up}$, which is $\theta_{m \in n}$ for the uplink. After measuring $\theta_{m \in n}^{up}$, the following equation can be used to estimate $\theta_o$, which represents an angle of arrival for an uplink signal, i.e., a geometric angle formed between a line drawn from base station 22 to mobile-station 28 and antenna array 23:

$$\theta_{m \in n}^{up} = \frac{2\pi}{\lambda^{up}} d_{m \in n} \cos\theta_o \quad \text{equation 6}$$

where $d_{m \in n}$ is the distance between antenna elements 26-m∈n and an arbitrary reference, and $\lambda^{up}$ represents a carrier wavelength for the uplink signal. Upon estimating $\theta_o$, complex weights $v_{m \in n}$ are set as follows:

$$v_{m \in n} = e^{-j\frac{2\pi}{\lambda^{down}} d_{m \in n} \cos\theta_o} \quad \text{equation 7}$$

where $\lambda^{down}$ represents a carrier wavelength for a downlink signal. Note that this technique for determining complex weights $v_{m \in n}$ assumes that the distances between antenna elements 26-m∈n within a same group 24-n are known, the antenna elements 26-m∈n within a same group 24-n are phase matched, and symmetry exists between uplink angle-of-arrivals and downlink angle-of-arrivals. Such assumptions are reasonable or may be easily obtained through calibration, as is known in the art.

The second technique for determining complex weights $v_{m \in n}$ relies on receiving information regarding phases at which signals transmitted from antenna array 23 arrive at mobile-station 28. Such information is also referred to herein as "feedback information" and is transmitted from mobile-station 28 to base station 22 over an uplink channel. Since complex weights $v_{m \in n}$ depend on the angle of arrival $\theta_o$ at base station 22, complex weights $v_{m \in n}$ need only be updated at the rate which $\theta_o$ changes, which is relatively slow compared to the rate at which channels fade. Thus, less update information regarding changes in $\theta_o$ is required, and less capacity (in the uplink channel) is required.

Disclosed for illustration purposes are several methods of feedback. It should be noted that other methods of feedback are possible, and the present invention should therefore not be limited to the ones described herein. In a first method, a dedicated pilot signal (to be used by all mobile-stations) is transmitted on each antenna element, wherein each pilot signal is unique for the antenna element from which it is being transmitted, e.g., Walsh code used on each antenna element for the pilot signal is different. Upon receiving the pilot signals, mobile-station 28 records the phases and feeds back such recordations for each received pilot signal to base station 22. Note that mobile-station 28 could feedback phases for every received pilot signal, or a phase of a pilot signal for a reference antenna element within a group along with phases of other pilot signals for antenna elements within the group relative to the reference antenna element.

In a second method, a dedicated pilot signal is also transmitted from each antenna element within antenna array 23, and only the phase of one pilot signal from a reference antenna element is fed back by mobile-station 28 to base station 22. If inter-antenna element spacing is constant within a group, the phases of each antenna element should differ by a constant phase $\Delta\theta$, which is represented by the following equation:

$$\Delta\theta = \frac{2\pi d}{\lambda^{down}} \cos\theta_o \qquad \text{equation 8}$$

While this method is simpler and requires less feedback, it is more sensitive to non-ideal inter-antenna element spacing.

A third method involves feeding back changes in phases based on previous phase measurements. This method requires some tuning between an update rate, an update step size and memory in measurement at mobile-station 28. If the memory is too long, error will build up and an incorrect reference will be used at the mobile-station for feedback decisions. A starting point is required which can be obtained by setting an initial absolute phase or by having an adaptive step size.

Upon processing and phase shifting each data stream $s_d$ in accordance with the above described signal processing technique, signals $S^{m \in n}$ comprising of the resulting data streams at associated power levels along with pilot signals are transmitted over antenna elements 26-m∈n. The remainder of the application will be describe herein with respect to the illustrative example and transmission matrix T. For simplicity sake, the references q and k will be used hereinafter to refer to antenna elements 26-m∈1 and 26-m∈2 belonging to groups 24-1 and 24-2, respectively. For example, signals $S^q$ and $S^k$ refer to signals $S^{m \in n}$ to be transmitted over antenna elements 26-m∈1 and 26-m∈2 (or antenna elements q and k), respectively. Based on the signal processing technique of the present invention, signals $S^q$ are defined by the following equation:

$$S^q = \sqrt{P_q} v_q (s_1 w_1 - s_2^* w_2) + \sqrt{P_{q\text{-}pilot}} w_{q\text{-}pilot} \qquad \text{equation 9}$$

where $P_q$ and $P_{q\text{-}pilot}$ represent respective transmit powers for signal $S^q$ and a pilot signal over antenna element q; $w_{q\text{-}pilot}$ is a Walsh code used for the pilot signal on antenna element q; $w_1$ and $w_2$ are extended Walsh codes associated with the mobile-station to which signal S is intended; and $w_{q\text{-}pilot}$, $w_1$ and $w_2$ are orthogonal to each other. In a preferred embodiment, $w_2$ is a complement of $w_1$, i.e., $w_2 = \overline{w}_1$, such that only one Walsh code is used per mobile-station (in a two group, two antenna element per group, antenna array configuration).

Similarly, signals $S^k$ are defined by the following equation:

$$S^k = \sqrt{P_k} v_k (s_2 w_1 + s_1^* w_2) + \sqrt{P_{k\text{-}pilot}} w_{k\text{-}pilot} \qquad \text{equation 10}$$

where $P_k$ and $P_{k\text{-}pilot}$ represent respective transmit powers for signal $S^k$ and a pilot signal over antenna element k; $w_{k\text{-}pilot}$ is a Walsh code used for the pilot signal on antenna element k; and $w_{k\text{-}pilot}$, $w_1$ and $w_2$ are orthogonal to each other. Note that no individual weighing via complex weights $v_q$ and $v_k$ are applied to the pilot signal because all mobile-stations will be using the same pilot signal to estimate distortion factor coefficients $\gamma_1$ and $\gamma_2$ for antenna groups 24-1 and 24-2, as will be described herein. Further note that the pilot signal Walsh codes $w_{q\text{-}pilot}$ and $w_{k\text{-}pilot}$ may be identical or different for some or all antenna elements q and k.

Figure 3:
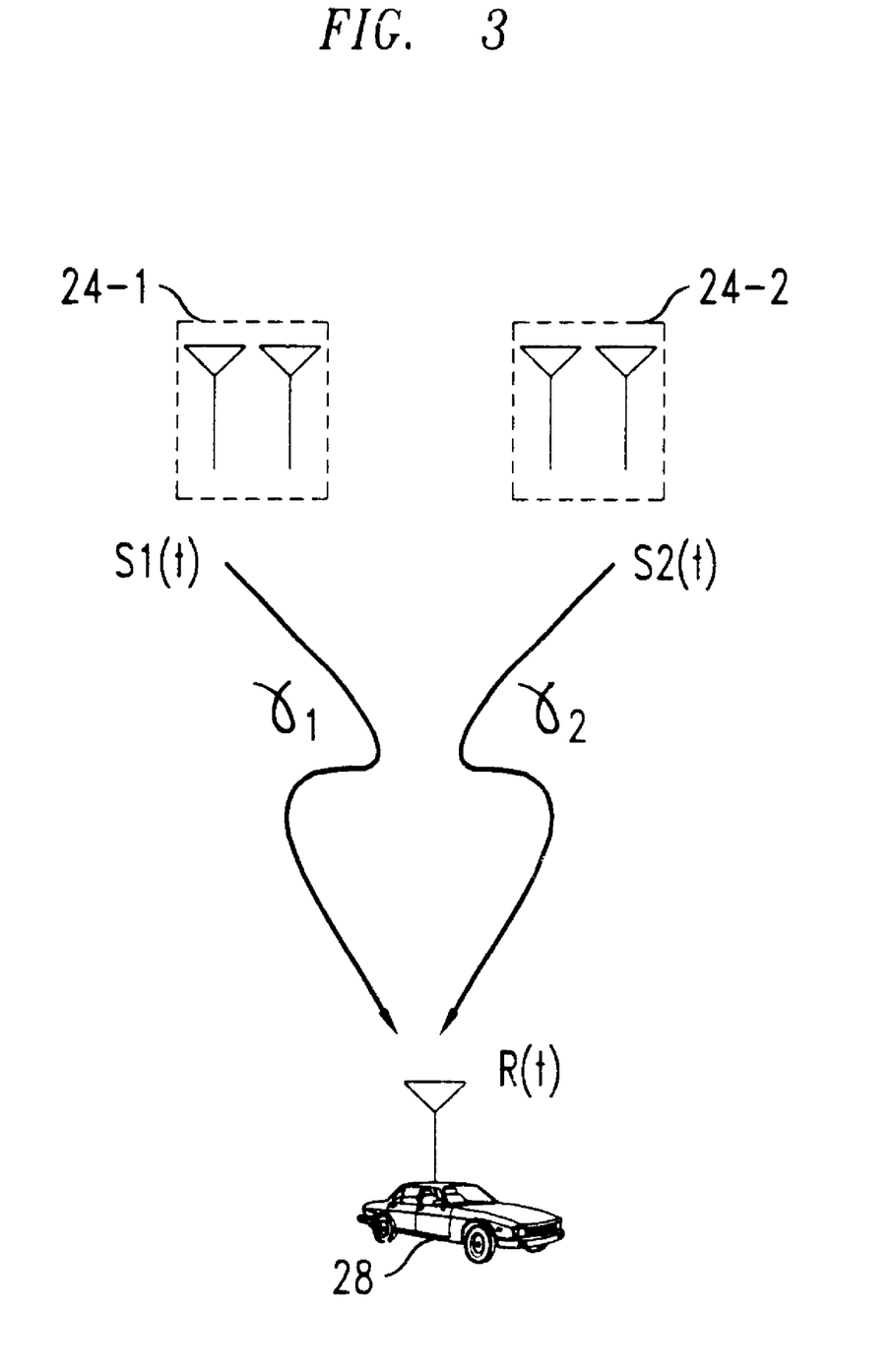
FIG. 3 depicts a transmission process in accordance with the present invention.

The transmitted signals $S^q$ and $S^k$ arrive at mobile-station 28 as signal R. See FIG. 3, which depicts the transmission process. Signal R is represented by the following equation:

$$R = \sum_{q=1}^{M \in 1} S^q \gamma_1 e^{j\theta_q} + \sum_{k=1}^{M \in 2} S^k \gamma_2 e^{j\theta_k} + noise \qquad \text{equation 11}$$

where $\gamma_1$ and $\gamma_2$ represent distortion factor coefficients (or time-varying multiplicative distortion due to Rayleigh fading) seen from respective groups 24-1 and 24-2, $$\theta_q = \frac{2\pi}{\lambda} d_q \cos\theta_o, \quad \theta_k = \frac{2\pi}{\lambda} d_k \cos\theta_o,$$

and noise is temporally and spatially white complex Gaussian noise. Distortion factor coefficients $\gamma_1$ and $\gamma_2$ can be estimated using pilot signals, as is well-known in the art. Specifically, $\gamma_1$ and $\gamma_2$ are estimated using the following equations:

$$\Gamma_q = \int w_{q\text{-}pilot} r \, dt = \gamma_q e^{j\theta_q} \qquad \text{equation 12}$$

$$\Gamma_k = \int w_{k\text{-}pilot} r \, dt = \gamma_k e^{j\theta_k} \qquad \text{equation 12a}$$

where $\Gamma_q$ and $\Gamma_k$ are integrations of the pilot signal transmitted over antenna elements q and k, and $\gamma_q$ and $\gamma_k$ are the distortion factor coefficients corresponding to antenna elements q and k. In one embodiment, $\gamma_1$ and $\gamma_2$ in equation 11 are distortion factor coefficients corresponding to a pilot signal estimated from a single reference antenna element in group 24-1 and 24-2, or average distortion factor coefficients corresponding to two or more antenna elements in each group 24-1 and 24-2. Alternately, $\gamma_1$ and $\gamma_2$ can correspond to the appropriate $\gamma_q$ and $\gamma_k$ in equation 11.

Assuming that the channel distortion is static over an integration period, by correlating received signal R with Walsh codes $w_1$ and $w_2$ (after removing a long pseudo-random noise code), correlation outputs $W_1$ and $W_2$ are respectively obtained:

$$W_1 = \sum_{q=1}^{M \in 1} \sqrt{P_q} \, v_q e^{j\theta_q} \gamma_1 s_1 + \sum_{k=1}^{M \in 2} \sqrt{P_k} \, v_k e^{j\theta_k} \gamma_2 s_2 + noise_1' \quad \text{equation 13}$$

$$W_2 = \sum_{k=1}^{M \in 2} \sqrt{P_k} \, v_k e^{j\theta_k} \gamma_2 s_1^* - \sum_{q=1}^{M \in 1} \sqrt{P_q} \, v_q e^{j\theta_q} \gamma_1 s_2^* + noise_2' \quad \text{equation 13a}$$

where noise$_1'$ and noise$_2'$ represent noise after being correlated with Walsh codes $w_1$ and $w_2$, respectively.

Using the distortion factor coefficients $\gamma_1$ and $\gamma_2$, decision statistics can be created for estimating $s_1$ and $s_2$, i.e., $\hat{s}_1$ and $\hat{s}_2$. Such decision statistics are as follows:

$$\hat{s}_1 = f\{\hat{\gamma}_1^* W_1 + \hat{\gamma}_2 W_2^*\} \quad \text{equation 14}$$

$$\hat{s}_2 = f\{\hat{\gamma}_2^* W_1 - \hat{\gamma}_1 W_2^*\} \quad \text{equation 14a}$$

where $f\{\bullet\}$ is an appropriate decision function, and $W_1^*$ and $W_2^*$ represent transposed conjugates of $W_1$ and $W_2$.

Expanding equation 14 and assuming perfect channel knowledge, estimate $\hat{s}_1$ is represented as follows:

$$\hat{s}_1 = f\left\{ s_1 \left( \sum_{q=1}^{M \in 1} \sqrt{P_q} \, v_q e^{j\theta_q} |\gamma_1|^2 + \sum_{k=1}^{M \in 2} \sqrt{P_k} \, v_k e^{j\theta_k} |\gamma_2|^2 \right) + \right. \quad \text{equation 15}$$
$$\left. \ldots \left( \sum_{q=1}^{M \in 1} \sqrt{P_q} \, v_q e^{j\theta_q} - \sum_{k=1}^{M \in 2} \sqrt{P_k} \, v_k e^{j\theta_k} \right) \gamma_1^* \gamma_2 s_2 + \right.$$
$$\left. \gamma_1^* noise_1' + \gamma_2 noise_2'^* \right\}$$

The same is done for equation 14a to obtain estimate $\hat{s}_2$. Based on the estimates $\hat{s}_1$ and $\hat{s}_2$, signal S (or $S^q$ and/or $S^k$) may be re-constructed at mobile-station 28.

Recall that no individual weighing (on a per mobile-station or user basis) of complex weights $v_q$ and $v_k$ were applied to pilot signals transmitted over antenna elements q and k because all mobile-stations were using the same pilot signal to estimate distortion factor coefficients $\gamma_1$ and $\gamma_2$. But the processing of received signal R assumes that the pilot signals have been properly weighted—that is, the mobile-stations estimate distortion factor coefficients $\gamma_1$ and $\gamma_2$ using complex weights $v_q = e^{-j\Theta_q}$ and $v_k = e^{-j\Theta_k}$. Since the pilot signals have not been properly weighted, complex weights $v_q$ and $v_k$ are not actually equal to $e^{-j\Theta_q}$ and $e^{-j\Theta_k}$, i.e., assumption is incorrect, there will be some error in processing the signal at mobile-station 28 causing degradation in performance.

One manner of correcting this problem is to assign unique pilot signals to each mobile-station, i.e., per user pilot signals. If per user pilot signals were assigned, then complex weights $v_q$ and $v_k$ can be applied to the pilot signals. Thus, the transmitted signal for mobile-station or user z over antenna elements q and k would be:

$$S_z^q = \sqrt{P_q} v_q (s_1 w_1 - s_2^* w_2) + \sqrt{P_{q\text{-}pilot\,for\,user\,z}} v_q w_{q\text{-}pilot\,for\,user\,z} \quad \text{equation 16}$$

$$S_z^k = \sqrt{P_k} v_k (s_2 w_1 + s_1^* w_2) + \sqrt{P_{k\text{-}pilot\,for\,user\,z}} v_k w_{k\text{-}pilot\,for\,user\,z} \quad \text{equation 16a}$$

where $w_{q\text{-}pilot\,for\,user\,z}$ and $w_{k\text{-}pilot\,for\,user\,z}$ represent the assigned pilot signal Walsh codes for user z being transmitted over antenna elements q and k.

At mobile-station 28, distortion factor coefficients $\gamma_{q-z}$ and $\gamma_{k-z}$ for user z can be estimated using the following equations:

$$\Gamma_{q-z} \doteq \int w_{q\text{-}pilot\,for\,user\,z} r \, dt = \gamma_{q-z} e^{j\Theta_{q-z}} \quad \text{equation 17}$$

$$\Gamma_{k-z} = \int w_{k\text{-}pilot\,for\,user\,z} r \, dt = \gamma_{k-z} e^{j\Theta_{k-z}} \quad \text{equation 17a}$$

Signals $s_1$ and $s_2$ can be estimated from the following equations:

$$\hat{s}_1 = \left( \sum_{q=1}^{M \in 1} \Gamma_{q-z} \right)^* W_1 + \left( \sum_{k=1}^{M \in 2} \Gamma_{k-z} \right) W_2^* \quad \text{equation 18}$$

$$\hat{s}_2 = \left( \sum_{k=1}^{M \in 2} \Gamma_{k-z} \right)^* W_1 - \left( \sum_{q=1}^{M \in 1} \Gamma_{q-z} \right) W_2^* \quad \text{equation 18a}$$

Figure 4:
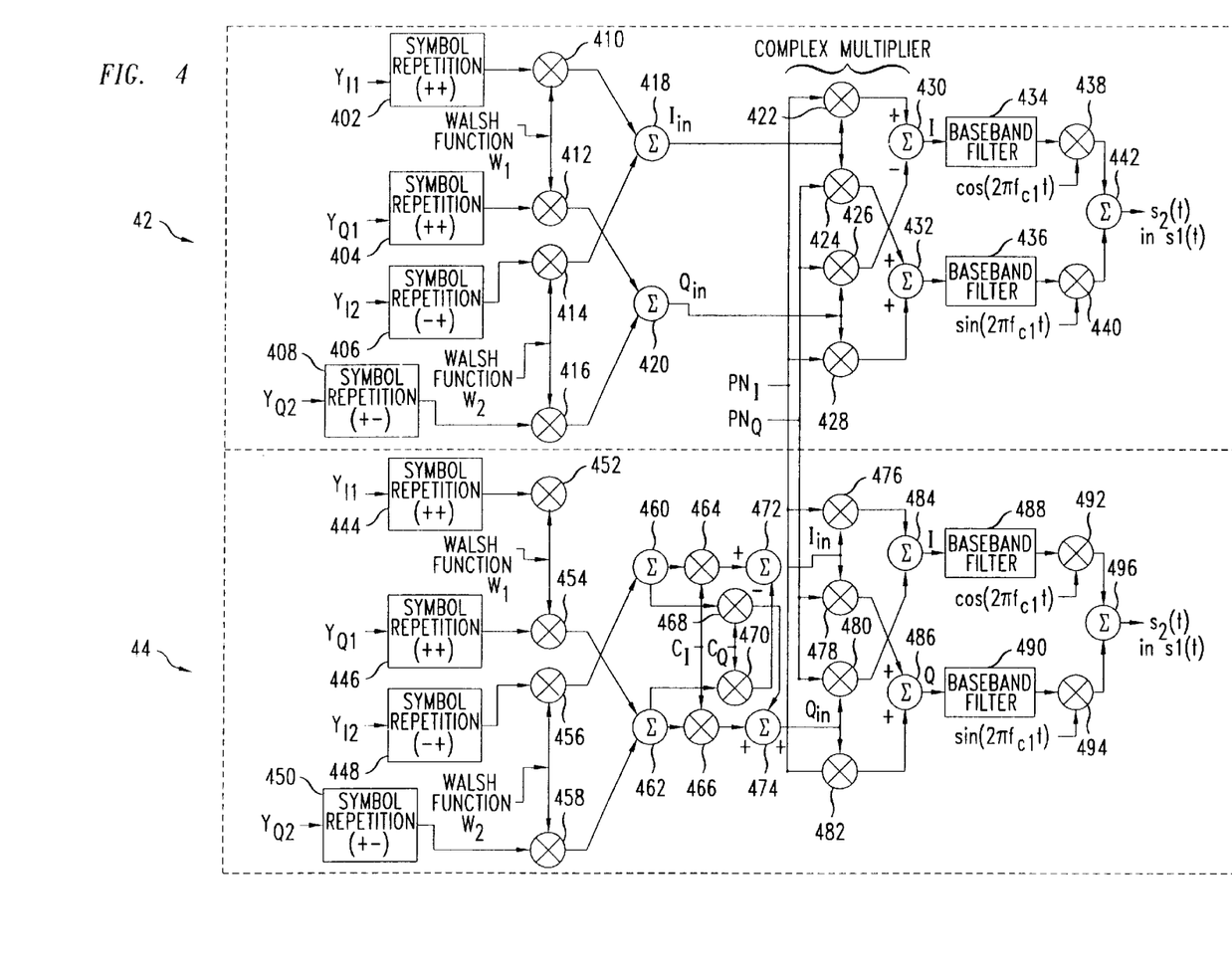
FIGS. 4 and 5 depict schematic diagrams of transmitters for signal processing at a base station equipped with a two group, two antenna element per group, antenna array configuration in accordance with one embodiment
Figure 5:
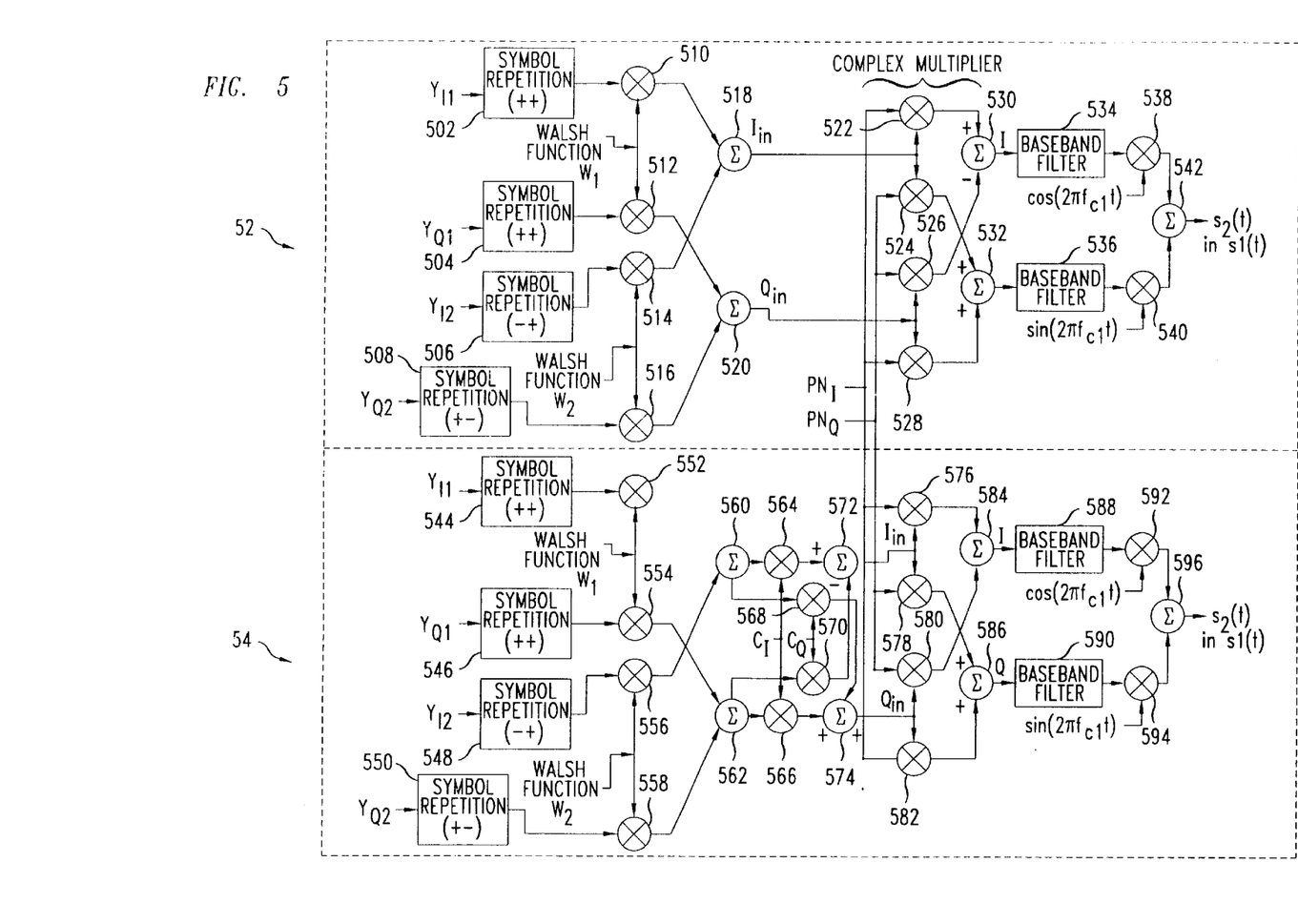

FIGS. 4 and 5 depict schematic diagrams of transmitters 40 and 50 for signal processing at base station 22 having a two group, two antenna element per group, antenna array configuration in accordance with one embodiment. Transmitter 40 comprises a first transmitter portion 42 and a second transmitter portion 44 for signal processing at group 24-1 for antenna elements 24-1-1 and 24-1-2, and transmitter 50 comprises a first transmitter portion 52 and a second transmitter portion 54 for signal processing at group 24-2 for antenna elements 24-2-1 and 24-2-2, respectively.

As shown in FIG. 4, first transmitter portion 42 comprises a plurality of symbol repeaters 402, 404, 406 and 408, mixers 410, 412, 414, 416, 422, 424, 426, 428, 438 and 440, summers 418, 420, 430, 432 and 442 and baseband filters 434 and 436. Symbol repeaters 402, 404, 406 and 408 receive a plurality of input signals $Y_{I1}$, $Y_{Q1}$, $Y_{I2}$ and $Y_{Q2}$, wherein signals $Y_{I1}$, $Y_{Q1}$, $Y_{I2}$ and $Y_{Q2}$ correspond to in-phase signal $s_e$, quadrature-phase signal $s_e$, in-phase signal $s_o$ and quadrature-phase signal $s_o$, respectively. Signals $Y_{I1}$, $Y_{Q1}$, $Y_{I2}$ and $Y_{Q2}$ are repeated by symbol repeaters 402, 404, 406 and 408 as indicated by the plus "+" and minus "−" signs between parenthesis in FIG. 4. For example, for each bit or symbol of signal $Y_{I1}$, symbol repeater 402 outputs the same bit or symbol twice, i.e., ++, whereas for each bit or symbol of signal $Y_{I2}$, symbol repeater 406 outputs the same bit followed by an inverse of the same bit, i.e., +−. The outputs of symbol repeaters 402 and 404 are mixed with Walsh code $w_1$ at mixers 410 and 412 whereas the outputs of symbol repeaters 406 and 408 are mixed with Walsh code $w_2$ at mixers 414 and 416. The outputs of mixers 410 and 414 are summed by summer 418, and the outputs of mixers 412 and 416 are summed by summer 420.

The output of summer 418 is mixed with in-phase and quadrature-phase pseudo-random number codes $PN_I$ and $PN_Q$ by mixers 422 and 424, and the output of summer 420 is mixed with the in-phase and quadrature-phase pseudo-random number codes $PN_I$ and $PN_Q$ by mixers 428 and 426, respectively. The outputs of mixers 422 and 426 are summed by summer 430, and the outputs of mixers 424 and 428 are summed by summer 432. The outputs of summers 430 and 432 are filtered by baseband filters 434 and 436 and then modulated via mixers 438 and 440 onto carrier signals defined by the functions $\cos(2\pi f_c t)$ and $\sin(2\pi f_c t)$, respectively. The outputs of mixers 438 and 440 are added together using summer 442 before being transmitted as signal $S_1$ in signal S1 over antenna element 24-1-1.

Second transmitter portion 44 of transmitter 40 comprises a plurality of symbol repeaters 444, 446, 448 and 450, mixers 452, 554, 456, 458, 464, 466, 468, 470, 476, 478, 480, 482, 492 and 494, summers 460, 462, 472, 474, 484, 486 and 496 and baseband filters 488 and 490. Symbol repeaters 444, 446, 448 and 450, mixers 452, 545, 456 and 458, summers 460 and 462 operate in a manner substantially identical to their counterparts in first transmitter portion 42, i.e., symbol repeaters 402, 404, 406 and 408, mixers 410, 412, 414 and 416 and summers 418 and 420.

The outputs of mixers 460 and 462 are then co-phased or phase-shifted such that the signal to be transmitted over associated antenna element 24-1-2 arrives in-phase at destination mobile-station 28 with the signal to be transmitted over antenna element 24-1-1. Specifically, the output of mixer 460 is mixed with the in-phase and quadrature-phase components $c_I$ and $c_Q$ of complex weight v associated with antenna element 24-1-2 using mixers 464 and 468, whereas the output of mixer 462 is mixed with the in-phase and quadrature-phase components $c_I$ and $c_Q$ of complex weight v associated with antenna element 24-1-2 using mixers 466 and 470. The outputs of mixers 464 and 470 are summed by summer 472, and the outputs of mixers 466 and 468 are summed by summer 474. The output of summer 472 is provided as inputs to mixers 476 and 478, and the output of summer 474 is provided as inputs to mixers 480 and 482. Mixers 476, 478, 480, 482, 492 and 494, summers 484, 486 and 496 and baseband filters 488 and 490 operate in a manner substantially identical to their counterparts in first transmitter portion 42, i.e., mixers 422, 424, 426, 428, 438 and 440, summers 430, 432 and 442, and baseband filters 434 and 436.

Note that first transmitter portion 42 does not include components for co-phasing the signal to be transmitted over its associated antenna element 24-1-1 because such signal is being used as the reference signal against which the signal to be transmitted over antenna element 24-1-2 is to be co-phased. It should be understood that first transmitter portion 42 may also include components for co-phasing its associated signal. If group 24-1 had additional antenna elements, the transmitter may include additional transmitter portions identical to second transmitter portion 44 except for the complex weight being applied.

The first and second transmitter portions 52 and 54 of transmitter 50 operate in a manner substantially identical to the first and second transmitter portions 42 and 44 of transmitter 40. The notable exceptions are as follows. Symbol repeaters 502, 504, 506, 508, 544, 546, 548 and 550 are configured to signals $Y_{I1}$, $Y_{Q1}$, $Y_{I2}$ and $Y_{Q2}$ such that their outputs are not identical to the outputs of their respective counterparts in transmitter 40. For example, symbol repeater 502 is a "+–" repeater, whereas its counterpart symbol repeater 402 is a "++" repeater. Another difference is that the outputs of symbol repeaters belonging to transmitter 50 are mixed with Walsh codes different from the Walsh codes used to mix the outputs of their respective counterparts in transmitter 40. For example, the output of symbol repeater 504 is mixed with Walsh code $w_2$, whereas the output of its counterpart symbol repeater 404 is mixed with Walsh code $w_1$.

Although the present invention has been described in considerable detail with reference to certain embodiments, other versions are possible. Therefore, the spirit and scope of the present invention should not be limited to the description of the embodiments contained herein.

We claim:

1. A method of signal processing for a wireless communications system employing an antenna array having at least a first antenna group with at least two antenna elements and a second antenna group with at least one antenna element, wherein the first and second antenna groups are spaced approximately ten carrier wavelengths or more apart from each other and the antenna elements belonging to the first antenna group are spaced approximately a half carrier wavelength or less apart from each other, the method comprising the steps of:

generating a plurality of data streams from a signal;

encoding each of at least two sets of a first plurality of representative data streams derived from the plurality of data streams using different orthogonal codes;

phase shifting a first set of the first plurality of representative data streams;

encoding each of at least one set of a second plurality of representative data streams derived from the plurality of data streams using different orthogonal codes, wherein different orthogonal codes are used to encode representative data streams of the first and second plurality of representative data streams derived from a same data stream in the plurality of data streams, the first and second plurality of representative data streams being representative data streams of the plurality of data streams that allow for the plurality of data streams to be recovered at a receiver after encoding;

transmitting an encoded and phase shifted first set of the first plurality of representative data streams over a first antenna element in the first antenna group;

transmitting an encoded second set of the first plurality of representative data streams over a second antenna element in the first antenna group; and transmitting an encoded set of the second plurality of representative data streams over an antenna element in the second antenna group.

2. The method of claim 1, wherein D number of data streams are generated from the signal S and D is equal to a number of antenna groups rounded up to the nearest power of two.

3. The method of claim 1, wherein the first set of the first plurality of representative data streams are phase shifted such that the encoded and phase shifted first set of the first plurality of representative data streams arrive in-phase with the encoded second set of the first plurality of representative data streams at the receiver.

4. The method of claim 1, wherein the step of phase shifting comprises the step of:

measuring an angle-of-arrival of a signal transmitted by the receiver, the angle-of-arrival indicating a phase difference between signals transmitted over the first and second antenna elements in the first antenna group.

5. The method of claim 1, wherein the step of phase shifting comprises the step of:

receiving phase information from the receiver indicating a phase difference between signals transmitted over the first and second antenna elements in the first antenna group.

6. The method of claim 1, wherein the plurality of data streams are recoverable at the receiver when the first and second plurality of representative data streams are such that a summation of products between a first representative data stream encoded with an orthogonal code and a second representative data stream encoded with a same orthogonal code, for all orthogonal codes, result in a value of zero, the first representative data stream is a representative data stream belonging to the first plurality of representative data streams and the second representative data stream is a representative data stream belonging to the second plurality of representative data streams.

7. The method of claim 1, wherein the orthogonal codes are Walsh codes.

8. The method of claim 1 comprising the additional steps of:

transmitting a first pilot signal over the first antenna element in the first antenna group;

transmitting a second pilot signal over the second antenna element in the first antenna group; and transmitting a third pilot signal over the antenna element in the second antenna group.

9. The method of claim 8, wherein the first, second and third pilot signals are encoded using an identical orthogonal code.

10. The method of claim 8, wherein the first, second and third pilot signals are unique pilot signals.

11. The method of claim 8, wherein the first and second pilot signals are encoded using an identical orthogonal code.

12. The method of claim 8, wherein the first and second pilot signals are unique pilot signals.

13. The method of claim 8, wherein the first, second and third pilot signals are associated with the receiver.

14. A wireless communications system comprising:

a plurality of antenna groups including a first antenna group having at least one antenna element and a second antenna group having at least two antenna elements, the first and second antenna groups spaced a distance apart from each other such that signals transmitted from the first antenna group experience fading independent of signals transmitted from the second antenna group, the two antenna elements of the second antenna group spaced a distance apart from each other such that signals transmitted from the antenna elements experience correlated fading; and a transmitter for generating a plurality of data streams from a signal, for transmitting each of at least two sets of a first plurality of representative data streams derived from the plurality of plurality of data streams and encoded using different orthogonal codes over the first antenna group, and for transmitting each of at least one set of a second plurality of representative data streams derived from the plurality of plurality of data streams and encoded using different orthogonal codes over the second antenna group, wherein different orthogonal codes are used to encode representative data streams of the first and second plurality of representative data streams derived from a same data stream in the plurality of data streams, the first and second plurality representative data streams being representative data streams of the plurality of data streams that allow for the plurality of data streams to be recovered at a receiver after encoding, and a first set of the second plurality of representative data streams being phase shifted for transmission over an antenna element belonging to the second antenna group.

15. The wireless communications system of claim 14, wherein the transmitter generates D number of data streams from the signal S and D is equal to a number of antenna groups rounded up to the nearest power of two.

16. The wireless communications system of claim 14, wherein the transmitter phase shifts the first set of the first plurality of representative data streams such that the encoded and phase shifted first set of the first plurality of representative data streams arrive in-phase with the encoded second set of the first plurality of representative data streams at the receiver.

17. The wireless communications system of claim 14 further comprising:

a second plurality of antenna groups for measuring an angle-of-arrival of a signal transmitted by the receiver, the angle-of-arrival indicating a phase difference between signals transmitted over the first and second antenna elements in the first antenna group.

18. The wireless communications system of claim 14 further comprising:

a receiver for receiving phase information from the receiver indicating a phase difference between signals transmitted over the first and second antenna elements in the first antenna group.

19. The wireless communications system of claim 14, wherein the plurality of data streams are recoverable at the receiver when the first and second plurality of representative data streams are such that a summation of products between a first representative data stream encoded with an orthogonal code and a second representative data stream encoded with a same orthogonal code, for all orthogonal codes, result in a value of zero, the first representative data stream is a representative data stream belonging to the first plurality of representative data streams and the second representative data stream is a representative data stream belonging to the second plurality of representative data streams.

20. The wireless communications system of claim 14, wherein the orthogonal codes are Walsh codes.

21. The wireless communications system of claim 14 the transmitter transmits a first pilot signal over the first antenna element in the first antenna group, a second pilot signal over the second antenna element in the first antenna group, and a third pilot signal over the antenna element in the second antenna group.

22. The wireless communications system of claim 21, wherein the first, second and third pilot signals are encoded using an identical orthogonal code.

23. The wireless communications system of claim 21, wherein the first, second and third pilot signals are unique pilot signals.

24. The wireless communications system of claim 21, wherein the first and second pilot signals are encoded using an identical orthogonal code.

25. The wireless communications system of claim 21, wherein the first and second pilot signals are unique pilot signals.

26. The wireless communications system of claim 21, wherein the first, second and third pilot signals are associated with the receiver.

* * * * *